Dec. 9, 1969     R. H. LE SAGE     3,482,482
DRIVE ANCHOR FASTENING DEVICES
Filed July 26, 1968
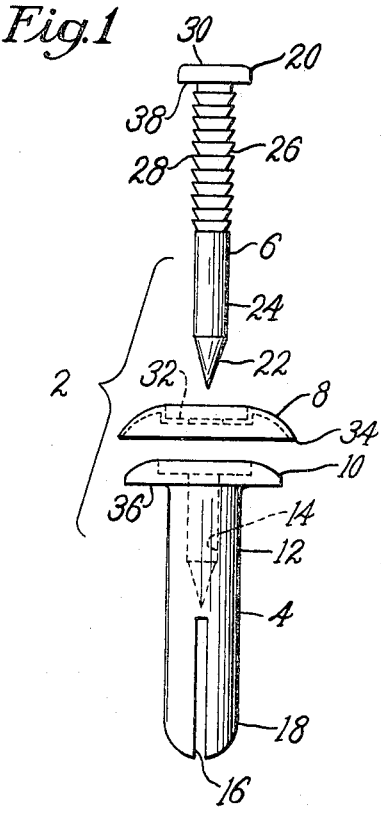
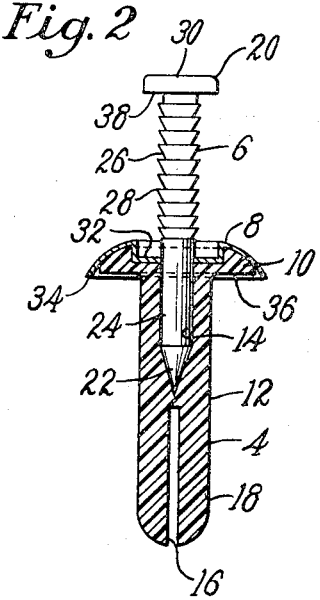
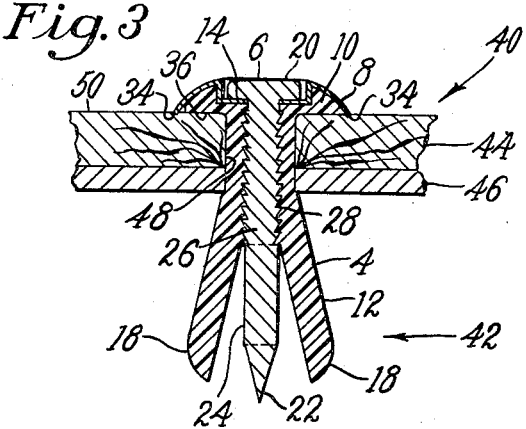
Inventor
Robert H. LeSage
By his Attorney United States Patent Office 3,482,482
Patented Dec. 9, 1969

3,482,482
DRIVE ANCHOR FASTENING DEVICES
Robert H. Le Sage, Reading, Pa., assignor to USM Corporation, Flemington, N.J., a corporation of New Jersey
Filed July 26, 1968, Ser. No. 748,088
Int. Cl. F16b 43/00, 13/04, 33/04
U.S. Cl. 85—83    3 Claims

ABSTRACT OF THE DISCLOSURE

A fastening device of the drive anchor type comprising an insert having a head portion and a shank portion, the head and shank portions being adapted to receive a driven nail. The end of the shank portion removed from the head portion is divided into at least two legs which are wedged outwardly from each other by the driven nail. The nail is provided with teeth which inhibit its removal from the insert once having been driven thereinto. A cap member is disposed about the head portion of the insert and also receives the nail. The cap portion is provided with an edge which cuttingly engages the surface of a support member in which the fastening device is to be secured.

BACKGROUND OF THE INVENTION

Field of the invention

This invention relates to drive anchors and is directed more particularly to an anchor which once having been set is difficult to remove unobtrusively.

Description of the prior art

The use of drive anchor type fasteners is now commonplace. One type of drive anchor currently in use comprises a sleeve member, which may be plastic, and a drive nail or screw which is adapted to be driven into the plastic sleeve. The sleeve usually has two or more parts which are wedgedly separated from each other by the nail or screw. When placed in a support, the wedgedly separated portions are on the opposite side of the support from a flanged head portion of the sleeve whereby to securely attach the fastener to the support. It is customary to use a threaded screw having a slotted head so that the screw may be removed subsequent to setting of the fastener whereby to remove the fastener and perhaps use it on another occasion.

In the transportation industry it has been found efficient and economical to ship relatively large containers, as by truck and/or by cargo ship. Such containers are generally filled at a factory or the like, sealed, then fitted onto a rolling bed whereby to transform the container from simply a box to the cargo carrying portion of a truck. Subsequently, if circumstances warrant, the box may be lifted from the rolling bed and placed in the hole of a cargo ship. Upon reaching its ultimate destination, the seal is broken on the container and the goods therein removed, ideally without having been handled or tampered with throughout the travels of the container.

The containers used in such transport usually comprise an inner wall and an outer wall with insulation or dead space therebetween. The inner wall generally comprises a layer of plywood which faces the interior of the container and a layer of metal attached thereto, the metal layer being disposed on the side of the inner wall facing the outer wall. Most fasteners in use today to secure plywood panels to metal backings are not entirely suitable for use in such containers because they are readily removed and subsequently replaced without leaving traces of the removal and replacement operation. Certain regulating authorities require a more secure fastener as a safeguard against smuggling, and other unauthorized shipment of goods, by insertion of goods between the inner and outer walls of such containers.

SUMMARY OF THE INVENTION

It is an object of the present invention to provide a fastener of the drive anchor type, suitable for attaching plywood to a sheet metal backing, which anchor cannot readily be removed from the plywood once having been inserted, or if removed, will leave evidence of having been tampered with.

With the above and other objects in view, as will hereinafter appear, and in accordance with a feature of the invention, the illustrative fastener comprises a drive anchor comprising a drive nail, an insert for receiving the drive nail, the insert being expandable responsive to the drive nail, and a collar portion penetratingly engageable with the surface in which the fastener is set.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation to the invention. The principles and features of this invention may be employed in various and numerous embodiments without departing from the scope of the invention.

BRIEF DESCRIPTION OF THE DRAWING

Reference is made to the accompanying drawings in which there is shown an illustrative embodiment of the invention from which its novel features and advantages will be apparent.

FIG. 1 is an elevational exploded view of one form of fastener illustrative of an embodiment of the invention;

FIG. 2, is a partially sectional and partially elevational view of the invention; and FIG. 3 is a sectional view of the invention, shown attached to a container wall.

DESCRIPTION OF THE PREFERRED EMBODIMENT

Referring to the drawings, it will be seen that the illustrative fastener 2 includes an insert 4, a nail 6 and a collar member 8.

The inset member 4 includes a head portion 10 and a shank portion 12, each adapted, as by a recess 14, to receive the nail 6. The shank portion 12 includes a slot 16 at its end remote from the head portion 10 whereby to divide an end portion of the shank into at least two leg members 18. The insert member 4 may be of plastic or other suitable material.

The nail member 6 includes a head 20 at one end and a point 22 at the other end. A portion 24 of the shank of the nail adjacent the point 22 is substantially smooth, whereby to be easily driven into the recess 14 of the insert 4. A second portion 26 of the nail shank, adjacent the head end of the nail, is provided with teeth or serrations 28 which are formed in such a manner as to inhibit removal of the nail from the insert, once having been driven thereinto. An upper surface 30 of the nail is generally smooth.

The collar member 8 is shaped substantially complementarily to the head portion 10 of the insert 4. The collar member 8 has a recess 32 which receives the nail head 20. The collar is provided with an annular edge 34 which, when the collar is pressed against the head portion of the insert, as shown in FIGS. 2 and 3, extends beyond the under surface 36 of the insert head portion 10. The collar member 8 is preferably of metal.

The fastener above described is desirable for use in containers having an inner wall 40 (FIG. 3) and an outer wall, not shown, defining an insulation or dead space 42 therebetween. The inner wall generally comprises an inside layer of wood 44 connected to a layer of metal 46.

In operation, a hole 48 is drilled through the wood 44 and metal 46. The insert member 4 is inserted in the hole 48 with the collar member fitted about the head portion of the insert. The nail member 6 is then driven into the recess 14, as by a hammer. The smooth portion 24 of the nail shank readily enters the recess 14 and is followed by the toothed portion 26 of the nail. As the nail is driven into the insert, the insert leg members 18 are wedged apart from each other, as shown in FIG. 3, whereby to secure the wood layer 44 to the metal layer 46. When the underside 38 of the nail head 20 engages the recess portion 32 of the collar 8 the collar is carried with the driven nail, whereby to cause the annular edge 34 of the collar to penetratingly engage the surface 50 of the wood layer 44.

Once set, the fastener in very difficult to remove without leaving traces. An attempt to pry the collar member 8 from the wood layer 44 usually leaves readily discernable marks on the wood about the collar member.

Having thus described my invention, what I claim is new and desire to secure by Letters Patent of the United States is:

1. Fastener device comprising a headed nail member, an insert member for receiving said nail member, said insert member having a head portion for receiving said nail member and a shank portion, said shank portion having leg portions wedgedly separable by said nail member, said head portion extending radially outwardly from said shank portion and extending axially to exceed the axial dimension of the nail head, and a collar member shaped complementarily to said insert head portion and disposed adjacent said insert head portion, said insert head portion and said collar member being provided with complementarily shaped recesses for receiving said head portion of said nail member, the axial dimension of said collar member exceeding the axial dimension of said insert head portion, said collar member having an edge cuttingly engageable with a surface of a panel in which the fastener device is disposed.

2. The invention according to claim 1 in which said nail member is provided with teeth for inhibiting withdrawal of the nail member from said insert member.

3. The invention according to claim 1 in which said nail has said nail head at a first end thereof and a point at a second end thereof, said teeth extending substantially from said nail head and terminating remote from said nail point, said nail member being smooth-walled from said point to said teeth.

References Cited

UNITED STATES PATENTS

| 1,588,081 | 6/1926 | Wiswell | 85—32 |
| 2,843,861 | 7/1958 | Gandy | 85—84 |
| 3,022,701 | 2/1962 | Potruch | 85—83 |
| 3,044,340 | 7/1962 | Luhm | 85—83 |
| 3,234,842 | 2/1966 | Sauter | 85—84 |

FOREIGN PATENTS

| 932,408 | 11/1947 | France. |
| 1,497,866 | 9/1967 | France. |
| 805,795 | 5/1951 | Germany. |
| 557,219 | 2/1957 | Italy. |

MARION PARSONS, Jr., Primary Examiner

U.S. Cl. X.R.

85—21, 50, 84